RUSSELL WALKER
RUDOLPH F. KEMKA
CARL O. MARKKANEN
INVENTORS

BY Andrew L Bain
George B. Oujnott
ATTORNEYS

RUSSELL WALKER
RUDOLPH F. KEMKA
CARL O. MARKKANEN
INVENTORS

United States Patent Office 2,995,705
Patented Aug. 8, 1961

2,995,705
TACHOMETER
Russell Walker, North Caldwell, Rudolph F. Kemka, Hillsdale, and Carl O. Markkanen, Hasbrouck Heights, N.J., assignors to General Precision, Inc., Little Falls, N.J., a corporation of Delaware
Filed May 5, 1960, Ser. No. 27,073
12 Claims. (Cl. 324—70)

The present invention relates to the measurement of small angular movements of shafts, or, to detecting changes in the speed of rotation in shafts revolving at a very slow rate of speed.

Numerous scientific devices depend on the amount of angular rotation of a shaft, or on the speed of a rotating shaft in order to carry out their functions. When the shaft is rotating at a fairly high speed, or when the rotational speed need not be too exact, it is not very difficult to control the rotational speed, or angle through which the shaft is to travel. However, in certain precise scientific devices, it is extremely important to have an exact speed or rotational angle. Assuming that a device is to be kept rotating by means of a servomechanism at a speed of a few revolutions per hour, changes in the rate of rotation are almost impossible to detect. Likewise, rotating devices are extremely useful for analog computers, e.g., circular slide rules. In getting a digital reading, it is often important that the angle of rotation be read as closely as possible. Yet, unless a very large slide rule is used, it is often impossible to obtain any precise reading.

Although many attempts may have been made to provide a position indicating angular reading device furnishing information in digital form to a resolution of a few seconds of arc, none, as far as we are aware were successful when carried out into practice in connection with scientific instruments.

It has now been discovered that small angles of a few seconds of arc can be measured, and in some cases, even to an ultimate resolution of one second of arc, i.e., better than one part per million.

Thus, it is an object of the present invention to provide a device which can detect angular change or movements in a shaft of very small magnitude.

Another object of the present invention is to provide an angle vernier which will not load the shaft so that the placing of the vernier on the shaft will not affect the working of the particular scientific instrument associated therewith.

It is also within the contemplation of the invention to provide a device adapted to furnish a signal to a speed control servo so as to control the speed of a shaft rotating at an extremely slow angular velocity.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

The invention in its broadest aspects utilizes as an angle measuring vernier or tachometer, a pair of axially aligned circular means, one stationary and one rotatable. Around each of said circular means are a plurality of radially aligned first signal passing and signal impeding sections, said impeding sections being of identical areas, equally spaced apart. One of said circular means has $n$ impeding sections and the other has $n$ plus one impeding sections. A first signal giving means is disposed so as to provide a first signal through said first passing section. Said stationary circular means also has thereon a second set of radially aligned signal passing and impeding sections. To sense the interference pattern which said first passing and impeding sections give to said first signal when said rotatable circular means turns, there is set on rotatable mounting means some sensing means which feeds back a signal to a servomotor causing said mounting means to rotate. A second set of radially aligned signal passing and impeding sections are on said stationary circular means, and a second signal giving means are on said rotatable mounting means disposed so as to provide a signal through said second passing sections. The utilization of the foregoing arrangement in carrying out the foregoing objects as well as other objects and advantages of this arrangement will become apparent from the following description taken in conjunction with the accompanying drawing in which:

Figure 1:
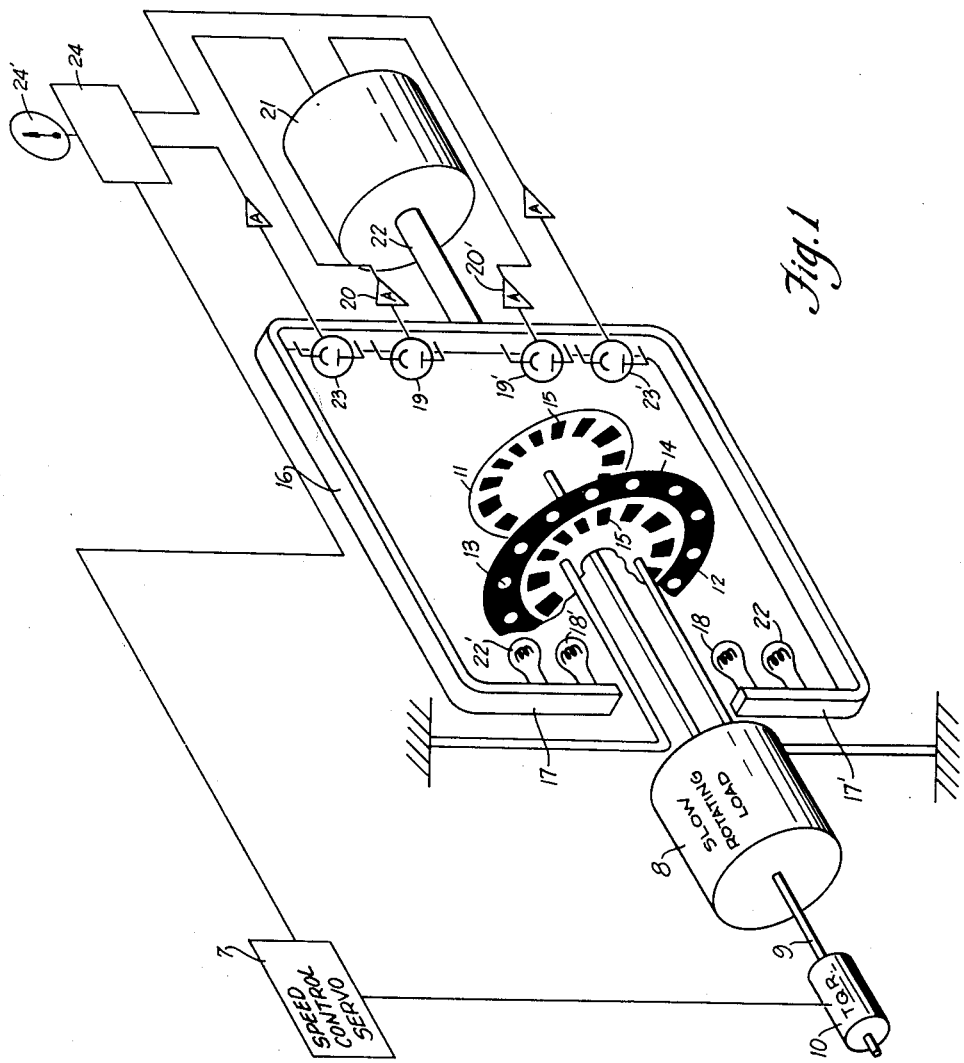
FIGURE 1 is a longitudinal view of a contemplated arrangement for controlling the speed of a slowly rotating shaft.
Figure 2:
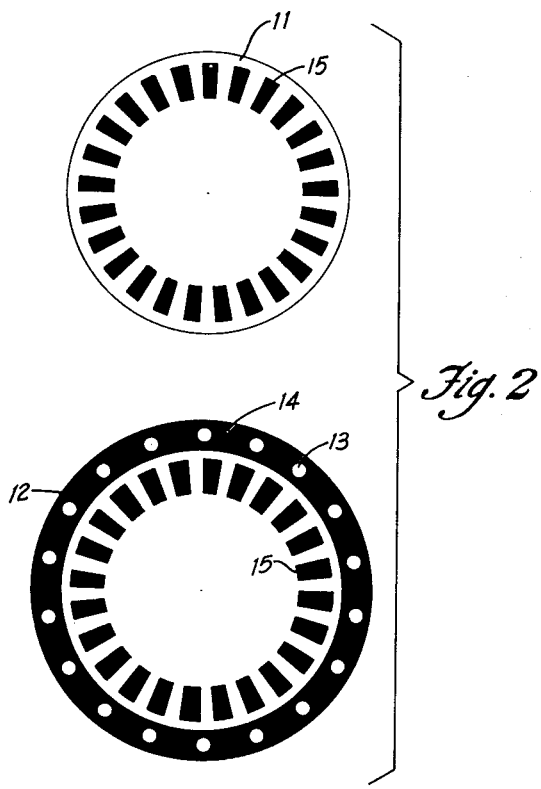
FIG. 2 is a view of the faces of two disks constructed in accordance with the principles of the invention.
Figure 3:
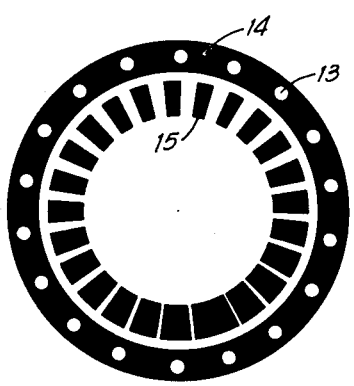
FIG. 3 shows a front view of the disks shown in FIG. 2 when mounted on the device depicted in FIG. 1; and, FIG. 4 depicts two cylinders constructed on the same principles as the two disks illustrated in FIG. 2.
Figure 4:
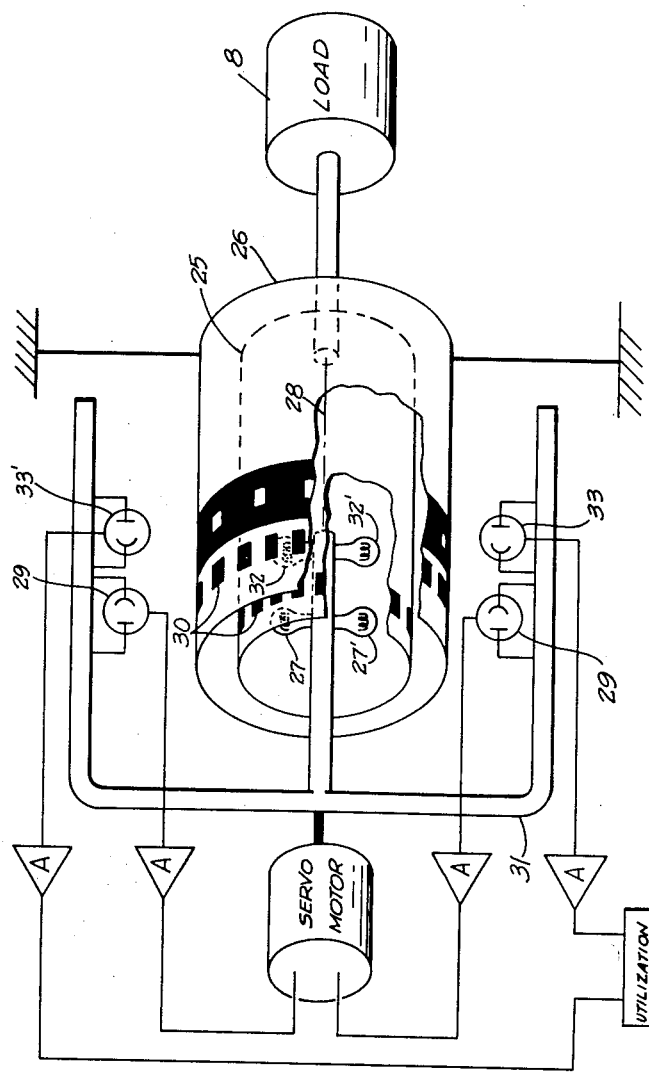

The present invention will be described with particular reference to its use as the information source of a speed control servo 7 which oversees the rotational speed of a load 8 turning at an extremely slow speed and whose speed is controlled by means of a torquer 10 or other device applied to load shaft 9. Once the principles of the invention are understood, its application to other uses will be more readily appreciated.

Load 8 must be kept rotating at a speed of a few turns per minute or per hour. Since it turns very slowly, any speedup or slowdown is almost impossible to detect immediately. To promptly detect any change in rotation, without materially adding to the load on shaft 9, there is provided on load shaft 9 a transparent plastic circular means, e.g., thin rotatable disk 11, and in proximity thereto are similar circular means, i.e., transparent stationary disk 12 which is affixed to the housing of the device. These two disks are precisely on the same cylindrical axis, axially opposed and in parallel planes. The outstanding difference between the two disks is that bordering on the periphery of stationary disk 12 are a plurality of small signal passing and signal impeding sections namely apertures 13 in a black border 14. These apertures are identical and equally spaced apart, and the function of these apertures will become clear shortly.

Below apertures 13 on black or opaque border 14 of disk 12, and on the corresponding opposite portion of disk 11, there are a number of other signal passing and signal impeding sections such as opaque markings or bits 15, which in a very finely calibrated disk are merely uniformly spaced radial lines, and, on a coarser disk the markings form a plurality of spherical equilateral identical trapezoidal sections. These bit lines or markings 15 define alternately opaque and transparent areas. However, one of the disks has $n$ bits and the other disk has $n$ plus one bits or markings. As used herein, the expression "$n$ and $n$ plus one" merely implies that one disk has one more bit than the other and can therefore likewise be construed as meaning "$n$ and $n$ minus one." Around the disks are mounting means which can be in the form of a horseshoe shaped member 16, the outer edges of the horseshoe 17 and 17' are inwardly bent so as to be disposed over the bits of the rotatable and stationary disks. On these bent edges 17 and 17' are signal giving means, shown in the drawing as two light sources 18 and 18' which cast a light signal through the two transparent disks. Mounted on the base of horseshoe 16 directly opposite the light signal sources, but on the other side of disks 11 and 12 are signal sensing means, e.g., two photocells 19 and 19'. The turning of first load shaft 9 will cause disk 11 to rotate. As one bit on disk 11 moves to adjacent space, the matching pattern of n and n plus one bits will create a shadow effect, i.e., an optical illusion is created that a shadow runs around the disk. Photocells 19 and 19' provide a signal through amplifiers 20 and 20' to a servomotor 21 whose construction is such that shaft 22 on which horseshoe 16 is placed will be rotated by the servomotor 21 if the signals given by the two photocells are not of equal intensity. This causes the sensing means or photocells to straddle the interference pattern caused by the movement of the bits on the rotating disk, i.e., each revolving sensing means or photocell seeks to receive the same lighting effect which is located midway between the two bits or impeding sections which coincide and the two bits or sections which are side by side. As one bit on the rotating disk moves to adjacent space, the shadow effect speeds through 360°. If the ratio of bits between the stationary disk and the rotating disk is n and n plus one, the shadow effect will rotate in the same direction as the rotating disk. If the ratio is reversed, the shadow effect will rotate counter to the disk rotation. The ratio of motion comparable to gear ratio is based on the number of bits in the rotating disk. Thus, with 24 bits on the rotating disk and 25 or 23 bits on the stationary disk, the ratio of shadow rotation to disk rotation is 24 to 1. Unless there is a special reason why the rotational direction of the shadow and consequently the rotation of the photocells should be counter to the direction of the rotating disk, the stationary disk will have the n bits and the rotating disk, n plus one bits. As the photocells follow the shadow effect or rather the sensing means straddle the rotating medium between the strong and weak signal or the light and dark area, shaft 22 will turn at a speed of n times the speed of the first load shaft 9.

As already mentioned, bordering the periphery of disk 12 are a second set of radially aligned signal receiving and signal passing sections, namely a plurality of apertures 13 on a black border. Extending before these apertures from the horseshoe mounting means are a second set of signal giving means or lamps 22 and 22'; and, on the base of the horseshoe opposite lamps 22 and 22' are a second pair of photocell sensing means 23 and 23' adapted to receive the signal light from lamps 22 and 22' passing through sections or apertures 13. As disk 11 rotates, the second set of lamps 22 and 22' acting on the second pair of sensing means photocells 23 and 23' through apertures 13 will cause a plurality of pulses therein.

If, S is the rotational speed of the load shaft in r.p.m., (n plus one) is the number of bits on the rotating disk, and, M is the number of apertures on the stationary disk, the number of pulses per minute felt by the photocells will be $S \times (n \text{ plus one}) \times M$ pulses per minute.

Thus, if load 8 is to be kept rotating at a speed of one revolution every hour or 1/60 revolution per minute; the rotating disk has 120 bits; and the stationary disk has 100 apertures, there will be produced in counter 24; 1/60×120×100=200 pulses per minute or over three pulses per second. It is thus apparent that any change in speed of load 8 can be controlled and detected immediately.

The output of photocells 23 and 23' is passed on to a counter 24 which may have visible display means 24'. The output of counter 24 is fed to a speed control servo monitoring the speed of the first or load shaft 9. Without speed control servo 7, display means 24' acts as an angle vernier providing a fine reading for any angular movement of load shaft 9. With 360 apertures and 360 bits, i.e., one bit and one aperture for every degree of arc, one pulse will be displayed on the reading means for every ten seconds of arc.

The simplest way to construct the disks depicted in the drawing is to draw two very large disks, some two or three feet in diameter. This will provide some six to ten feet of circumference on which it is possible to carefully lay out n and n plus one bits, indicating the center by a cross. The disks so drawn are then carefully photographed and reduced to a desired size. Precision is important since reduction in size does not reduce angular errors.

As illustrated in the drawing, the vernier or tachometer need not be disks. In many cases it may be preferable to provide a pair of telescoped concentric hollow cylinders 25 and 26. The inner cylinder 25 is preferably the rotating cylinder and the outer cylinder 26 is the stationary cylinder. A pair of lamps 27 and 27' are provided over the cylindrical axis 28 and photocells 29 and 29' are located over the bits 30. The lamps and photocells are mounted on a rotatable horseshoe 31. If desired, the positioning of the lamps and photocells may be reversed. Close clearance is required between the cylinders to minimize any errors due to eccentricity in positioning the cylinders. Because of the fact that the bits 30 are all rectangular, greater precision is possible. Also, by providing the second set of lamps 32 and 32' opposed to the second set of photocells 33 and 33' in the same cylindrical planes as the first sets of lamps and photocells, a more compact packaging is possible.

The signal giving means and sensing means need not necessarily be lamps and photocells. Furthermore, the first and second signal giving means and sensing means need not be of the same sort. It is possible to utilize the basic principles herein described with sound, magnetic or electromagnetic signals and sensing means, or a combination of signal giving and sensing means, depending on the type of the arrangement desired, use, or other factors.

In constructing the mounting means or horseshoe, provision should be made for adjusting the sensing means or photocells. Thus, for an identical amount of illumination, two photocells may not give off precisely the same signal. If the photocells initially selected are as equal as possible, any difference in signal intensity may be adjusted by physically moving the photocells slightly. When the two disks are at rest, the two photocells opposed to the bits should give off signals of equal intensity. Adjustment can also be made in the counter or readout.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A device of the character described, comprising in combination; a pair of axially aligned circular means, one stationary and one rotatable; a plurality of radially aligned first signal passing and signal impeding sections around each of said circular means, said impeding sections being of identical areas, equally spaced apart, one of said circular means having n impeding sections and the other having n plus one; first signal giving means disposed so as to provide a first signal through said first passing sections; a second set of radially aligned signal passing and impeding sections on said stationary circular means; rotatable mounting means; sensing means on said mounting means adapted to sense the interference pattern said first passing and impeding sections give to said first signal when said rotatable circular means turn; a servomotor causing said rotatable mounting means to turn in response to the signal from said sensing means; second signal giving means on said rotatable mounting means disposed so as to provide a signal through said second passing sections; and, utilization means using the pulsating signal passing through said second passing sections.

2. A device as claimed in claim 1, said circular means being a pair of axially opposed disks.

3. A device as claimed in claim 1, said circular means being a pair of telescoped concentric cylinders.

4. A device as claimed in claim 1, one of said signal giving means being a light source.

5. A device as claimed in claim 1, both of said signal giving means being light sources.

6. A tachometer, comprising in combination; a pair of axially aligned circular means, one stationary and one rotatable; a plurality of radially aligned first signal passing and signal impeding sections around each of said circular means, said impeding sections being of identical areas, equally spaced apart, one of said circular means having $n$ impeding sections and the other having $n$ plus one; first signal giving means disposed so as to provide a first signal through said first passing section; a second set of radially aligned signal passing and impeding sections on said stationary circular means; rotatable mounting means; sensing means on said mounting means adapted to sense the interference pattern said first passing and impeding sections give to said first signal when said rotatable circular means turn; a servomotor causing said rotatable mounting means to turn in response to the signal from said sensing means; second signal giving means on said rotatable mounting means disposed so as to provide a signal through said second passing sections; and, a counter counting the signal pulses passing through said second passing sections including display means displaying said count.

7. A speed control device controlling the speed of a slow turning shaft, comprising in combination; a pair of axially aligned circular means, one stationary and one rotatable, said rotatable one being mounted on said slow turning shaft; a plurality of radially aligned first signal passing and signal impeding sections around each of said circular means, said impeding sections being of identical areas, equally spaced apart, one of said circular means having $n$ impeding sections and the other having $n$ plus one; first signal giving means disposed so as to provide a first signal through said first passing sections; a second set of radially aligned signal passing and impeding sections on said stationary circular means; rotatable mounting means; sensing means on said mounting means adapted to sense the interference pattern said first passing and impeding sections give to said first signal when said rotatable circular means turn; a servomotor causing said rotatable mounting means to turn in response to the signal from said sensing means; second signal giving means on said rotatable mounting means disposed so as to provide a signal through said second passing sections; and, a speed control servo acting on said slow turning shaft in response to the signal pulses passing through said second passing sections.

8. A device of the character described, comprising in combination; a pair of axially aligned circular means, one stationary and one rotatable; a plurality of radially aligned first transparent and opaque sections around each of said circular means, said opaque sections being of identical areas, equally spaced apart, one of said circular means having $n$ opaque sections and the other having $n$ plus one; rotatable mounting means; a first light signal source on said mounting means disposed so as to provide a first light signal through said first transparent sections; photocell sensing means on said mounting means opposed to said first light signal source adapted to sense the interference pattern said first transparent and opaque sections give to said first light signal when said rotatable circular means turns; a servomotor causing said rotatable mounting means to turn in response to the light signal from said photocell sensing means; a second set of radially aligned transparent and opaque sections on said stationary circular means; a second light signal source on said rotatable mounting means disposed so as to provide a signal through said second transparent sections; and, utilization means using the pulsating signal passing through said second transparent sections.

9. A device of the character described, comprising in combination; a pair of axially aligned circular means, one stationary and one rotatable; a plurality of radially aligned first transparent and opaque sections around each of said circular means, said opaque sections being of identical areas, equally spaced apart, one of said circular means having $n$ opaque sections and the other having $n$ plus one; rotatable mounting means; a first light signal source on said mounting means disposed so as to provide a first light signal through said first transparent sections; photocell sensing means on said mounting means opposed to said first light signal source adapted to sense the interference pattern said first transparent and opaque sections give to said first light signal when said rotatable circular means turns; a servomotor causing said rotatable mounting means to turn in response to the light signal from said photocell sensing means; a second set of radially aligned transparent and opaque sections on said stationary circular means; a second light signal source on said rotatable mounting means disposed so as to provide a signal through said second transparent sections; second photocell sensing means on said mounting means adapted to sense the pulsating signal from said second light signal source through said second transparent sections; and, utilization means using the pulsating signal sensed by said second photocell sensing means.

10. A device as claimed in claim 9, said first transparent and opaque sections around said circular means having $n$ opaque sections on said rotatable circular means.

11. A device as claimed in claim 9, said first transparent and opaque sections around said circular means having $n$ plus one opaque sections on said rotatable circular means.

12. A device as claimed in claim 9, said circular means being disks, said second set of radially aligned transparent and opaque sections being disposed above said first set, said second photocell sensing means being disposed on said mounting means above said first photocell sensing means opposed to said first light signal source.

References Cited in the file of this patent

UNITED STATES PATENTS

| 1,871,404 | Brown | Aug. 9, 1932 |
| 1,918,908 | Heronimos | July 18, 1933 |
| 2,267,282 | Larson | Dec. 23, 1941 |